S. S. SMITH.
HAND CORN PLANTER.
No. 43,139. Patented June 14, 1864.
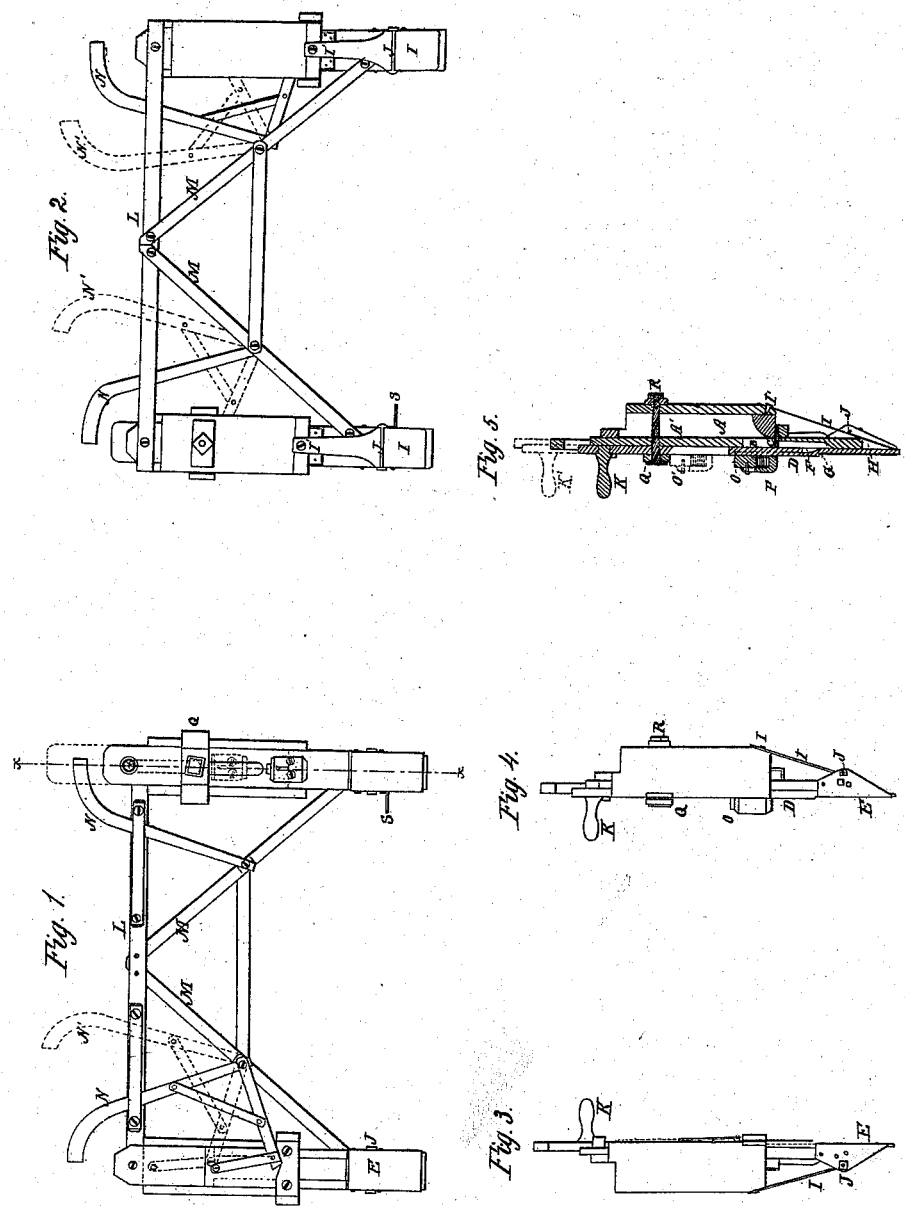

UNITED STATES PATENT OFFICE.

SOLOMON S. SMITH, OF NORTH FAIRFIELD, OHIO.

HAND CORN-PLANTER.

Specification forming part of Letters Patent No. 43,139, dated June 14, 1864.

*To all whom it may concern:*

Be it known that I, SOLOMON S. SMITH, of North Fairfield, in the county of Huron and State of Ohio, have invented new and useful Improvements in Corn-Planters; and I do hereby declare that the following is a full and complete description of the construction and operation of the same, reference being had to the accompanying drawings, making part of this specification, in which—

Figure 1 is a back view. Fig. 2 is a front view. Figs. 3 and 4 are side views; and Fig. 5 is a vertical section in the direction of the line $x\,x$ in Fig. 1.

My invention relates to a double hand-planter so arranged that two rows can be planted at once, or by detaching the connecting-frame two single planters are produced.

I will first describe Fig. 5, which shows the internal arrangement and operation.

A represents the seed-box. At the bottom of this there is an opening, B, in the posterior wall, A', which is continually filled with grain when the machine is in use. The bottom of the recess B is provided with an elastic substance, C, like a brush, which will yield to pressure and thus permit the grains of corn to pass into the opening below.

D represents the plunger. The lower end of this is within the metallic case E, which forms the nose of the machine.

There is a recess, F, in the inner side of the plunger, which is carried above the brush C when the plunger is drawn up. This recess receives a sufficient number of grains of corn for a hill, and when the plunger is depressed these grains are carried below the brush C and fall into the recess G. When the plunger is again raised these grains fall down into the cavity H, the front wall of which consists of a thin plate of steel, I, secured to the front of the machine at I' and meeting the plate E at an acute angle. A rod, J, passing through the sides of the nose E, not only supports the sides, but acts as a fulcrum to the spring I. When the plunger is drawn up the lower end of the plate I rests against the lower end of the nose E, forming therewith a wedge-shaped body which easily penetrates the ground. When the plunger descends it carries with it the grains that are lodged in the cavity H, and when the machine is withdrawn from the earth the soil covers them. The plungers are worked by handles K when used singly, or two may be united by the cross-bar L and braces M. In this case the cross-bar is of sufficient length for the distance between the rows. When two planters are thus united the plungers are worked by means of the levers N in Figs. 1 and 2, the dotted lines N' showing the position of the levers when the plungers are raised. In order that the plungers shall not come up with a solid stroke or jar, I provide a stop, O, with an elastic spring, P, the stop striking against the cross-bar Q. This cross-bar is held in place by a bolt, R, which passes through the seed-box A and gives firmness and security to the parts.

The manner of using this machine is as follows: If used as a double machine, the operator takes a lever, N, in each hand and brings them into the position shown by the dotted lines N'. Then by forcing the nose E into the ground where the seed is to be deposited the levers are brought to the position seen at N, by which movement the plunger descends and the seed is deposited under the soil. If used as a single machine, the handle K is raised to K' and then depressed to its former position, with the nose E inserted into the ground. A foot-piece, S, is attached to the case E, which serves the double purpose of a depth-gage and foot-piece to force the planter into the ground.

What I claim as my improvement, and desire to secure by Letters Patent, is—

The plunger D, brush C, recesses B, F, and G, spring-plate I, nose E, handles K and N, spring O, and stop O', when these several parts are arranged and operating substantially as and for the purpose set forth.

SOLOMON S. SMITH.

Witnesses:
J. BRAINERD,
J. LEONARD.